(12) United States Patent
Notarnicola et al.

(10) Patent No.: US 11,131,204 B2
(45) Date of Patent: Sep. 28, 2021

(54) ADDITIVELY MANUFACTURED NESTED SEGMENT ASSEMBLIES FOR TURBINE ENGINES

(71) Applicant: General Electric Company, Schenectady, NY (US)

(72) Inventors: Michael Robert Notarnicola, Cincinnati, OH (US); Matthew Elliott Karesh, Cincinnati, OH (US); Jason Joseph Bellardi, Cincinnati, OH (US); Aigbedion Akwara, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 224 days.

(21) Appl. No.: 16/106,558

(22) Filed: Aug. 21, 2018

(65) Prior Publication Data

US 2020/0063578 A1 Feb. 27, 2020

(51) Int. Cl.
| | | |
|---|---|---|
| *F01D 11/08* | (2006.01) | |
| *F01D 9/04* | (2006.01) | |
| *B29C 64/153* | (2017.01) | |
| *F01D 11/00* | (2006.01) | |
| *F01D 25/24* | (2006.01) | |
| *B33Y 10/00* | (2015.01) | |
| *B33Y 80/00* | (2015.01) | |

(52) U.S. Cl.
CPC .............. *F01D 9/04* (2013.01); *B29C 64/153* (2017.08); *F01D 11/006* (2013.01); *F01D 25/246* (2013.01); *B33Y 10/00* (2014.12); *B33Y 80/00* (2014.12); *F05D 2230/22* (2013.01); *F05D 2240/11* (2013.01); *F05D 2240/128* (2013.01)

(58) Field of Classification Search
CPC ...... F01D 25/24; F01D 25/246; F01D 11/005; F01D 11/006; F01D 9/04; F01D 11/08; F05D 2240/127; F05D 2240/11
See application file for complete search history.

(56) References Cited

U.S. PATENT DOCUMENTS

| | | |
|---|---|---|
| 1,423,466 A | 7/1922 | Snyder |
| 6,402,464 B1 | 6/2002 | Chiu et al. |
| (Continued) | | |

OTHER PUBLICATIONS

International Search Report Corresponding to Application No. PCT/US2019/047466 dated Nov. 13, 2019.

*Primary Examiner* — Woody A Lee, Jr.
*Assistant Examiner* — Maxime M Adjagbe
(74) *Attorney, Agent, or Firm* — Dority & Manning, P.A.

(57) ABSTRACT

A nested segment assembly and a method of additively manufacturing the same are provided. In one example aspect, the nested segment assembly includes a first component segment and a segment component segment positioned adjacent the first component segment. The first component segment has an end face and a tongue projecting outwardly from the end face. The second component segment defines a groove. The groove is defined at an end face of the second component segment that is adjacent the end face of the first component segment. The first component segment and the second component segment are additively printed such that at least a portion of the tongue of the first component segment is nested within the groove defined by the second component segment. Segmented components having a tesla valve formed therebetween are also provided.

20 Claims, 11 Drawing Sheets

(56) References Cited

U.S. PATENT DOCUMENTS

| | | | |
|---|---|---|---|
| 6,468,669 B1 | 10/2002 | Hasz et al. | |
| 6,554,571 B1 * | 4/2003 | Lee | F01D 5/187 |
| | | | 416/92 |
| 6,910,854 B2 * | 6/2005 | Joslin | F01D 5/225 |
| | | | 415/139 |
| 7,052,235 B2 | 5/2006 | Alford et al. | |
| 7,874,791 B2 * | 1/2011 | Ferber | F01D 5/225 |
| | | | 415/137 |
| 8,206,092 B2 * | 6/2012 | Tholen | F01D 11/08 |
| | | | 415/173.1 |
| 9,249,649 B2 * | 2/2016 | Fripp | E21B 43/16 |
| 9,482,249 B2 | 11/2016 | Kottilingam et al. | |
| 9,624,779 B2 | 4/2017 | Schick et al. | |
| 9,776,282 B2 | 10/2017 | Subramanian et al. | |
| 2010/0034647 A1 | 2/2010 | Lee et al. | |
| 2016/0061385 A1 * | 3/2016 | Lin | F15D 1/02 |
| | | | 137/15.01 |
| 2016/0123186 A1 | 5/2016 | Stover et al. | |
| 2016/0222807 A1 | 8/2016 | Liebl et al. | |
| 2016/0333702 A1 * | 11/2016 | Slavens | F01D 25/12 |
| 2017/0130599 A1 | 5/2017 | Bunker et al. | |
| 2017/0248030 A1 | 8/2017 | Marusko et al. | |

\* cited by examiner

ADDITIVELY MANUFACTURED NESTED SEGMENT ASSEMBLIES FOR TURBINE ENGINES

FIELD

The present subject matter relates generally to segmented ring components of turbine engines, such as shroud hangers. More particularly, the present subject matter relates generally to additively manufactured segmented ring components.

BACKGROUND

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In some configurations, the turbine section includes, in serial flow order, a high pressure (HP) turbine and a low pressure (LP) turbine. The HP turbine and the LP turbine each include various rotatable turbine components such as turbine rotor blades, rotor disks and retainers. Further, the HP turbine and the LP turbine each include various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components.

In general, the HP turbine and LP turbine may additionally include shroud assemblies which further define the hot gas path. A clearance gap is defined between the shroud of a shroud assembly and the rotatable turbine components of an associated stage of rotatable turbine components. The shroud is typically retained within the gas turbine engine by a shroud hanger or hook, which in turn is coupled to various other components of the engine, such as a casing. Further, in many cases, nozzles positioned axially forward of a shroud assembly may contact the shroud assembly to define and generally seal the hot gas path.

In some instances, shroud hangers are assembled into segments and the segments are then assembled to form an annular shroud hanger ring. Conventionally, adjacent shroud hangers include slots machined into their respective end faces, or face of the hanger that faces an adjacent shroud hanger. For each split between adjacent shroud hangers, a spline seal is inserted into one of the slots and the shroud hangers are lined up and connected to form a segment. While spline seals adequately prevent high pressure air from leaking outboard to inboard and into the hot gas path during operation of the gas turbine engine, the process of assembling the shroud hanger ring is time consuming, tedious, and difficult, especially when aligning and connecting the last two shroud hangers of the ring. Moreover, similar challenges arise with the assembly of other segmented ring components, such as shrouds, nozzles, etc.

Accordingly, improved segmented components for use in turbine engines would be useful. In particular, segmented components, such as shroud hangers, that are reliable and easy to manufacture and assemble would be beneficial.

BRIEF DESCRIPTION

Aspects and advantages of the invention will be set forth in part in the following description, or may be obvious from the description, or may be learned through practice of the invention.

In one exemplary embodiment of the present disclosure, an additively manufactured nested segment assembly is provided. The nested segment assembly includes a first component segment having an end face and a tongue projecting outwardly from the end face. The nested segment assembly also includes a second component segment positioned adjacent the first component segment and defining a groove, wherein at least a portion of the tongue of the first component segment is nested within the groove defined by the second component segment.

In another exemplary embodiment of the present disclosure, a method for manufacturing a nested segment assembly is provided. The method includes depositing a layer of additive material on a bed of an additive manufacturing machine. Further, the method includes directing energy from an energy source of the additive manufacturing machine to successively fuse one or more layers of additive material on top of the layer of additive material to form the nested segment assembly. The formed nested segment assembly includes a first component segment having an end face and a tongue projecting outwardly from the end face, wherein the tongue has a nesting portion defining a height. The formed nested segment assembly also includes a second component segment positioned adjacent the first component segment and defining a groove, wherein the groove has an opening defining an opening height, wherein at least a portion of the nesting portion of the tongue is nested within the groove defined by the second component segment, and wherein the height of the nesting portion is greater than the opening height to inseparably join the first component segment and the second component segment.

In yet another exemplary embodiment of the present disclosure, a segmented component assembly is provided. The segmented component assembly includes a first component segment having an end face. Further, the segmented component assembly includes a second component segment positioned adjacent the first component segment and having an end face. Moreover, the segmented component assembly includes a tesla valve formed between the first component segment and the second component segment by the end face of the first component segment and the end face of the second component segment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
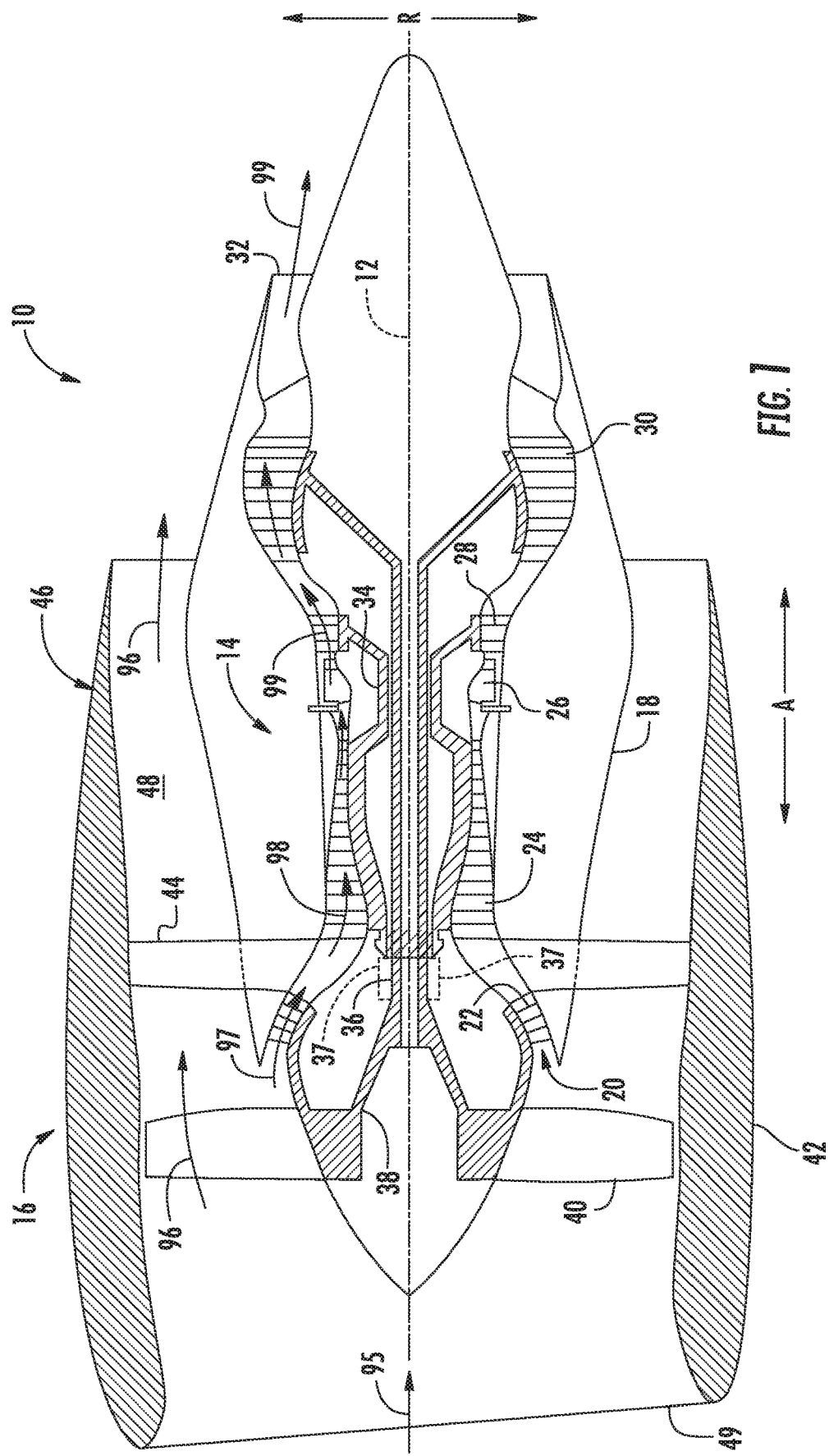
FIG. 1 provides a schematic cross-sectional view of a gas turbine engine in accordance with one embodiment of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, terms of approximation, such as "approximately," "substantially," or "about," refer to being within a ten percent (10%) margin of error. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

The present disclosure is generally directed to a nested segment assembly and a method of additively manufacturing the same. In one example aspect, the nested segment assembly includes a first component segment and a segment component segment positioned adjacent the first component segment. The first and second component segments may be shroud hangers, shrouds, nozzle segments, or other components for a turbine engine that are connected or joined together to form a partial or full annular ring. The first component segment has an end face and a tongue projecting outwardly from the end face. For instance, the tongue projects circumferentially outward toward the adjacent second component segment. The second component segment defines a groove. The groove is defined at an end face of the second component segment that is adjacent the end face of the first component segment. At least a portion of the tongue of the first component segment is nested within the groove defined by the second component segment. A flow path is defined between the tongue of the first component segment and interior surfaces defining the groove of the second component segment. The flow path allows for thermal growth of the components as well as a small amount of leakage from outboard to inboard or vice versa. The flow path may have a horseshoe shape when viewed along the axial direction and may be a tortuous path full of twists and turns. In particular, a plurality of turbulators may project from the tongue, the interior surfaces defining the groove in which the tongue is disposed, or both. Such turbulators define the flow path and create both friction and turning losses of fluid flowing therethrough to reduce the leakage across the flow path.

In some example aspects, the first component segment and the second component segment of the nested segment assembly are simultaneously additively manufactured as distinct, but inseparable monolithic components. That is, the components are printed such that the tongue of the first component segment is disposed or nested within the groove of the second component segment. The groove is sized to receive the tongue but the opening of the groove is such that the tongue is inseparable from the groove. In this way, the first component segment and the second component segment are printed in a nested manner or fashion. Other additional component segments may be printed to nest with the first component segment and/or the second component segment to form a longer nested segment assembly.

FIG. 1 provides a schematic cross-sectional view of an exemplary high-bypass turbofan type gas turbine engine 10 herein referred to as "turbofan 10" as may incorporate various embodiments of the present disclosure. As shown in FIG. 1, the turbofan 10 defines an axial direction A, a radial direction R, and a circumferential direction. Moreover, the turbofan 10 defines an axial centerline or longitudinal axis 12 that extends therethrough for reference purposes. In general, the axial direction A extends parallel to the longitudinal axis 12, the radial direction R extends orthogonally to or from the longitudinal axis 12, and the circumferential direction extends concentrically around the longitudinal axis 12.

The turbofan 10 includes a core turbine engine 14 disposed downstream from a fan section 16. The core turbine engine 14 may generally include a substantially tubular outer casing 18 that defines an annular core inlet 20. The outer casing 18 may be formed from multiple casings or a single casing. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within the turbofan 10 as desired or required.

As further shown in FIG. 1, the fan section 16 includes a plurality of fan blades 40 that are coupled to and that extend radially outwardly from the fan spool 38. An annular fan casing or nacelle 42 circumferentially surrounds the fan section 16 and a portion of the core turbine engine 14. The nacelle 42 is supported relative to the core turbine engine 14 by a plurality of circumferentially-spaced outlet guide vanes 44. Moreover, a downstream section 46 of the nacelle 42 (downstream of the outlet guide vanes 44) may extend over an outer portion of the core turbine engine 14 so as to define a bypass airflow passage 48 therebetween.

During operation of the turbofan 10, an initial air flow (indicated by arrow 95) may enter the engine 10 through an associated inlet 49 of the nacelle 42. The air flow 95 then passes through the fan blades 40 and splits into a first compressed air flow (indicated by arrow 96) that moves through the bypass airflow passage 48 and a second compressed air flow (indicated by arrow 97) that enters the LP compressor 22 through core inlet 20. The pressure of the second compressed air flow 97 is then increased and enters the HP compressor 24 (as indicated by arrow 98). After mixing with fuel and being combusted within the combustor of the combustion section 26, the combustion products 99 exit the combustion section 26 and flow through the HP turbine 28. Thereafter, the combustion products 99 flow through the LP turbine 30 and exit the exhaust nozzle 32 to produce thrust for the turbofan 10. The compressed air 96 flowing through the bypass airflow passage 48 also produces thrust for the turbofan 10 as it exits the downstream section 46 of the nacelle 42.

Figure 2:
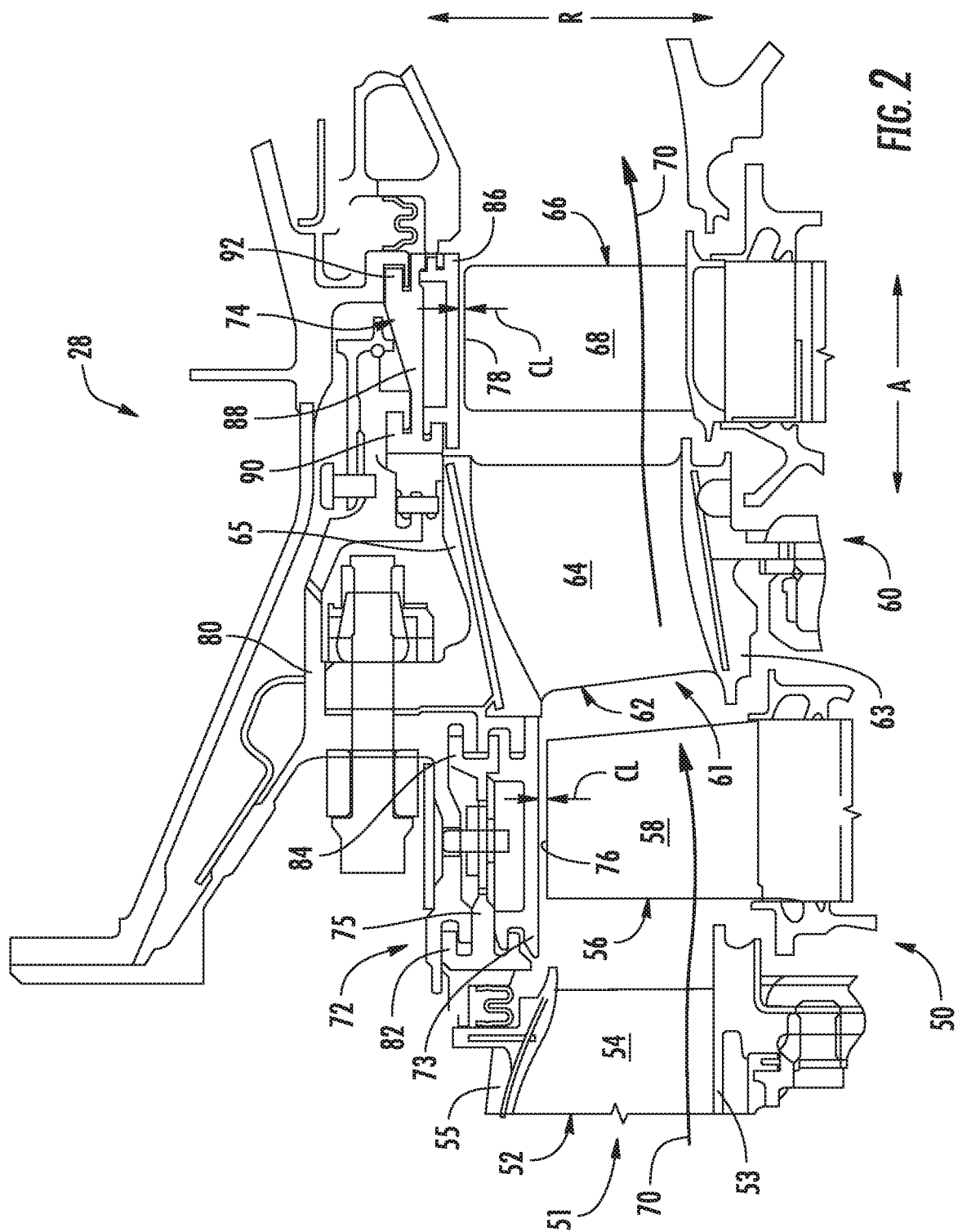
FIG. 2 provides a close up, cross sectional side view of a high pressure turbine portion of the gas turbine engine of FIG. 1.

FIG. 2 provides a close up, cross sectional view of the HP turbine 28 portion of the core turbine engine 14 of FIG. 1 as may incorporate various embodiments of the present disclosure. As shown in FIG. 2, the HP turbine 28 includes, in serial flow relationship, a first stage 50 which includes an annular array 52 of nozzle segments 51 (only one shown). Each nozzle segment 51 includes an inner band 53 and an outer band 55 spaced from the inner band 53, e.g., along the radial direction R. Moreover, each nozzle segment 51 includes a stator vane 54. The nozzle segments 51 form an annular nozzle segment ring. The stator vanes 54 of each nozzle segment 51 are spaced from an annular array 56 of turbine rotor blades 58 (only one shown), e.g., along the axial direction A. The HP turbine 28 further includes a second stage 60 which includes an annular array 62 of nozzle segments 61 (only one shown). Each nozzle segment 61 includes an inner band 63 and an outer band 65 spaced from the inner band 63, e.g., along the radial direction R. Moreover, each nozzle segment 61 includes a stator vane 64. The nozzle segments 61 form an annular nozzle segment ring. The stator vane 64 of each nozzle segment 61 is spaced from an annular array 66 of turbine rotor blades 68 (only one shown), e.g., along the axial direction A. The turbine rotor blades 58, 68 extend radially outwardly from and are coupled to the HP spool 34 (FIG. 1).

As further shown in FIG. 2, the HP turbine includes one or more shroud assemblies that form an annular ring about an annular array of rotor blades. For example, a shroud assembly 72 may form an annular ring around the annular array 56 of rotor blades 58 of the first stage 50 and a shroud assembly 74 may form an annular ring around the annular array 66 of turbine rotor blades 68 of the second stage 60. The shroud assembly 72 of the first stage 50 includes a plurality of shroud segments or shrouds 73 (only one shown in FIG. 2). Each shroud 73 is carried by an arcuate shroud hanger 75, which are in turn mounted to an annular casing 80 (which may be connected to or formed as part of casing 18 of FIG. 1). Each shroud hanger 75 is mounted to the casing 80 by forward and aft hooks 82, 84 which engage mating mechanical features of the casing 80. Similarly, the shroud assembly 74 of the second stage 60 includes a plurality of shroud segments or shrouds 86 (only one shown in FIG. 2). Each shroud 86 is carried by an arcuate shroud hanger 88, which are in turn mounted to the annular casing 80. Each shroud hanger 88 is mounted to the casing 80 by forward and aft hooks 90, 92 which engage mating mechanical features of the casing 80. In general, shrouds 73, 86 of the shroud assemblies 72, 74 are radially spaced from blade tips 76, 78 of each of the rotor blades 68. A radial or clearance gap CL is defined between the blade tips 76, 78 and the shrouds.

The inner bands 53, 63, outer bands 55, 65, and stator vanes 54, 64 of the nozzle segments 51, 61 and the shroud assemblies 72, 74 and the turbine rotor blades 58, 68 at least partially define a hot gas path 70 for routing combustion gases from the combustion section 26 (FIG. 1) through the HP turbine 28. The inner bands 53, 63, outer bands 55, 65, shrouds 73, 86, and shroud hangers 75, 88 generally reduce leakage of high pressure compressor discharge air, denoted as P3 air, into the lower pressure hot gas path 70.

It should be noted that the shroud assemblies disclosed above may additionally be utilized in a similar manner in the low pressure compressor 22, high pressure compressor 24, and/or low pressure turbine 30. Accordingly, shroud assemblies as disclosed herein are not limited to use in HP turbines, and rather may be utilized in any suitable section of a gas turbine engine. Moreover, shrouds, shroud hangers, nozzle segments, and other components that may be connected together to form an annular ring or a partial ring are generically called "component segments" as used herein. That is, the shrouds 73, 86, the shroud hangers 75, 88, nozzle segments 51, 61 may all be considered component segments.

Figure 3:
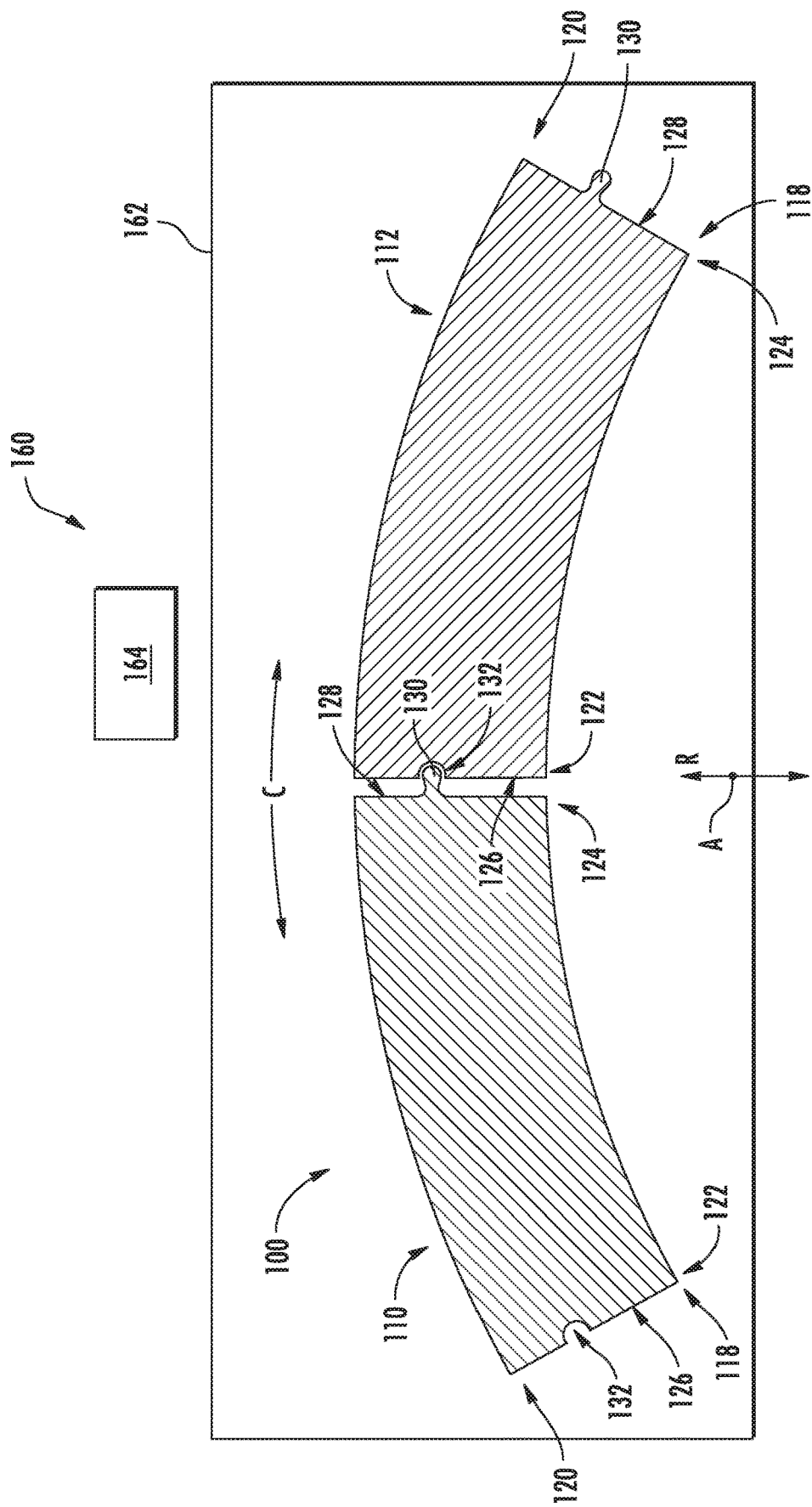
FIG. 3 provides an axial, cross sectional view of an exemplary nested segment assembly in accordance with exemplary embodiments of the present disclosure.

FIG. 3 provides an axial, cross sectional view of an exemplary nested segment assembly 100 in accordance with exemplary embodiments of the present disclosure. More particularly, the nested segment assembly 100 depicted in FIG. 3 is a nested shroud hanger assembly having a first shroud hanger nested with an adjacent second shroud hanger. For instance, the shroud hangers may be one of the shroud hangers 75, 88 of FIG. 2. Although the nested segment assembly 100 is described here as an application for gas turbine engines in the aviation industry, it should be appreciated that the nested segment assembly 100 can be configured for use in any suitable application and in any suitable industry. For example, the inventive aspects described herein could be used in the automotive, maritime, power generation, or other suitable industries.

In accordance with aspects of the present disclosure, some or all of the nested segment assembly 100 may be formed using an additive-manufacturing process, such as a 3-D printing process. The use of such a process may allow the component segments of the nested segment assembly 100 to be nested together (i.e., connected together but not attached) but yet formed as single monolithic components. In particular, the manufacturing process may allow the nested segment assembly 100 to be formed with a variety of features not possible when using prior manufacturing methods. For example, the additive manufacturing methods described herein enable the manufacture of segment components having unique features, configurations, thicknesses, materials, densities, and structures not possible using prior manufacturing methods. Some of these novel features can, for example, permit relative motion between two component segments of the nested segment assembly 100 after simultaneous formation of such components using an additive manufacturing process as described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, projections, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the component segments of the nested segment assembly 100 described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the component segments may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the component segments of the nested segment assembly 100 described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such component segments may be nested together yet still allow for slight relative motion therebetween, e.g., for ease of assembly and thermal growth. In addition, the additive manufacturing process enables the manufacture of a single component having different materials such that different portions of the component may exhibit different performance characteristics. The successive, additive nature of the manufacturing process enables the construction of these novel features. As a result, the component segments of the nested segment assembly 100 described herein may exhibit improved functionality and reliability.

As shown in FIG. 3, like the turbofan 10 of FIG. 1, the nested segment assembly 100 defines an axial direction A, a radial direction R, and a circumferential direction C. Moreover, the nested segment assembly 100 defines an axial centerline AX (FIG. 4) that extends therethrough for reference purposes. In general, the axial direction A extends parallel to the axial centerline AX, the radial direction R extends orthogonally to or from the axial centerline AX, and the circumferential direction C extends concentrically around the axial centerline AX.

Figure 4:
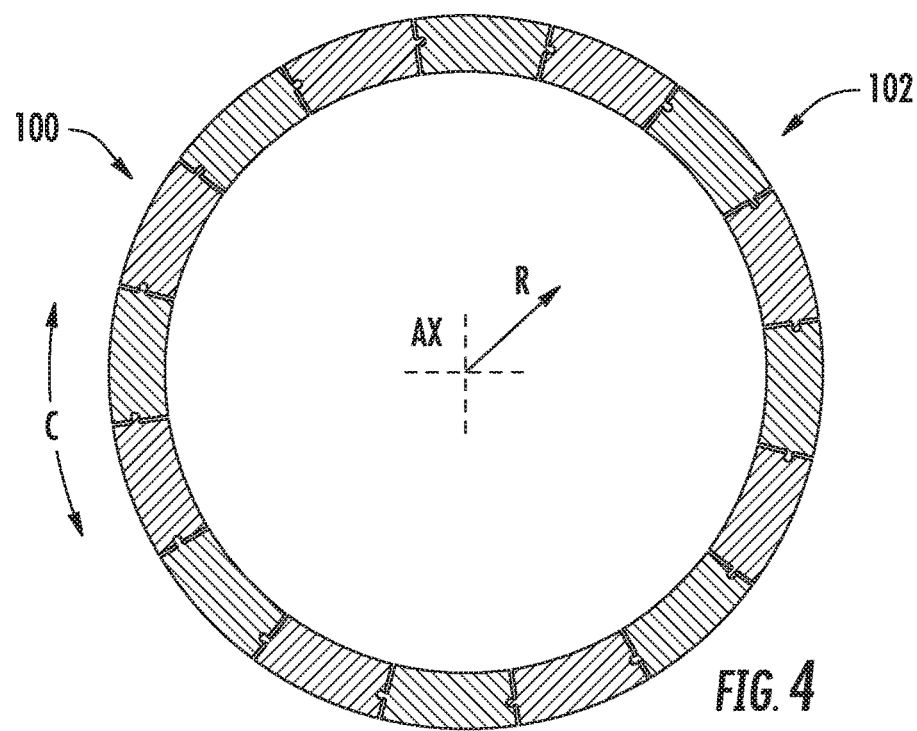
FIG. 4 provides an axial view of an exemplary nested segment assembly formed as an annular ring in accordance with exemplary embodiments of the present disclosure.
Figure 5:
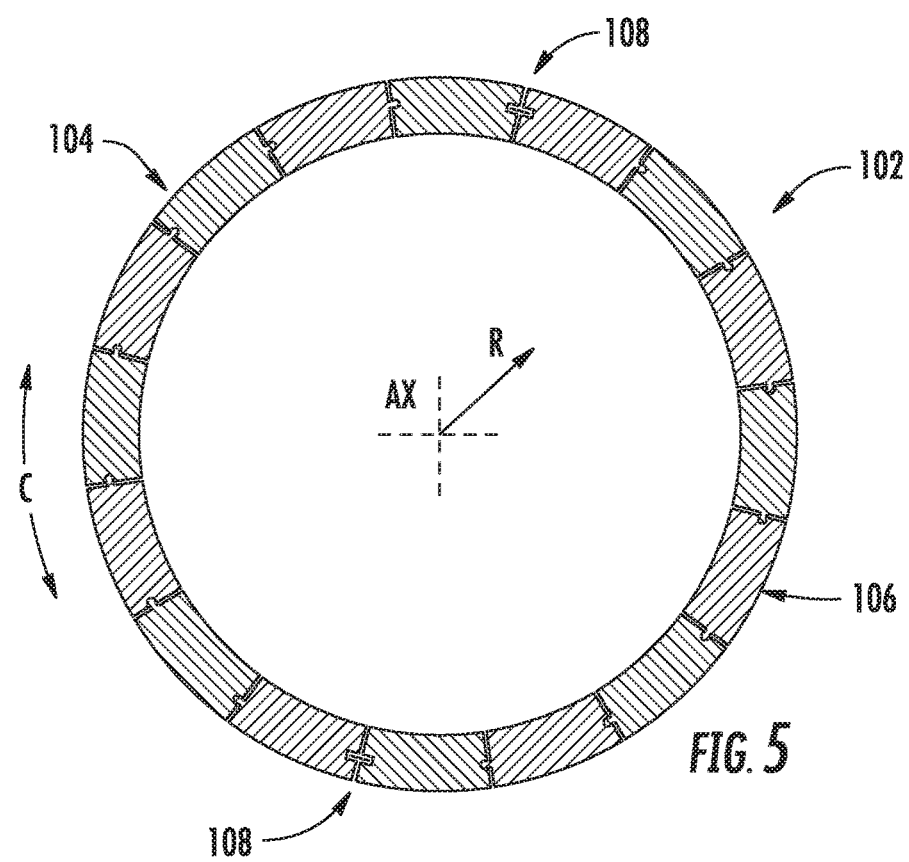
FIG. 5 provides an axial view of a first exemplary nested segment assembly and a second exemplary nested segment assembly connected together to form an annular ring in accordance with exemplary embodiments of the present disclosure.

The nested segment assembly 100 includes a first component segment 110 and a second component segment 112 nested with the first component segment 110. The second component segment 112 is adjacent the first component segment 110, e.g., along the circumferential direction C. Although only two (2) component segments are shown in FIG. 3, any suitable number of component segments may be nested together to form the nested segment assembly 100. As one example, as shown in FIG. 4, the nested segment assembly 100 may include a plurality of component segments nested together to form an annular ring 102. As another example, as shown in FIG. 5, a first nested segment assembly 104 may include a plurality of component segments nested together to form one half of an annular ring and a second nested segment assembly 106 may include a plurality of component segments nested together to form the other half of the annular ring. The first nested segment assembly 104 may be connected together with the second nested segment assembly 106 via a traditional method, e.g., by spline seal assemblies 108 in which a spline seal is inserted into slots defined in slashes faces of adjacent component segments.

With reference to FIG. 3, each of the segment components 110, 112 extend between a forward end 114 and an aft end 116, e.g., along the axial direction A (FIG. 7), between an inner end 118 and an outer end 120, e.g., along the radial direction R, and between a first end 122 and a second end 124, e.g., along the circumferential direction C. Further, each of the segment components 110, 112 have a first end face 126 at their respective first ends 122 a second end face 128 at their respective second ends 124. Generally, the first and second end faces 126, 128 of the segment components are orthogonal to the circumferential direction C.

As noted above, the first component segment 110 is nested with the adjacent second component segment 112. In particular, the first component segment 110 is nested with the second component segment 112 by certain nesting features. As shown in FIG. 3, a projection or tongue 130 projects outward from the second end face 128 of the first component segment 110 at its second end 124. In particular, the tongue 130 projects outward from the second end face 128 of the first component segment 110 along the circumferential direction C. As further depicted, the second component segment 112 defines a groove 132 at its first end face 126. The axial cross section of the groove 132 is defined having a shape that is generally complementary to the axial cross section of the tongue 130 as shown. At least a portion of the tongue 130 of the first component segment 110 is nested within the groove 132 defined by the second component segment 112. Although not shown in FIG. 3, a component segment may be nested with the first component segment 110 at its first end 122 and another component segment may be nested with the second component segment 112 at its second end 124. For instance, a component segment having a tongue at its second end may nest within the groove 132 defined by the first component segment 110 at its first end 122 and a component segment defining a groove at its first end may allow for the tongue 130 of the second component segment 112 to nest therein. Further adjacent component segments may be nested in a like fashion, e.g., to form a partial or full annular ring.

Figure 6:
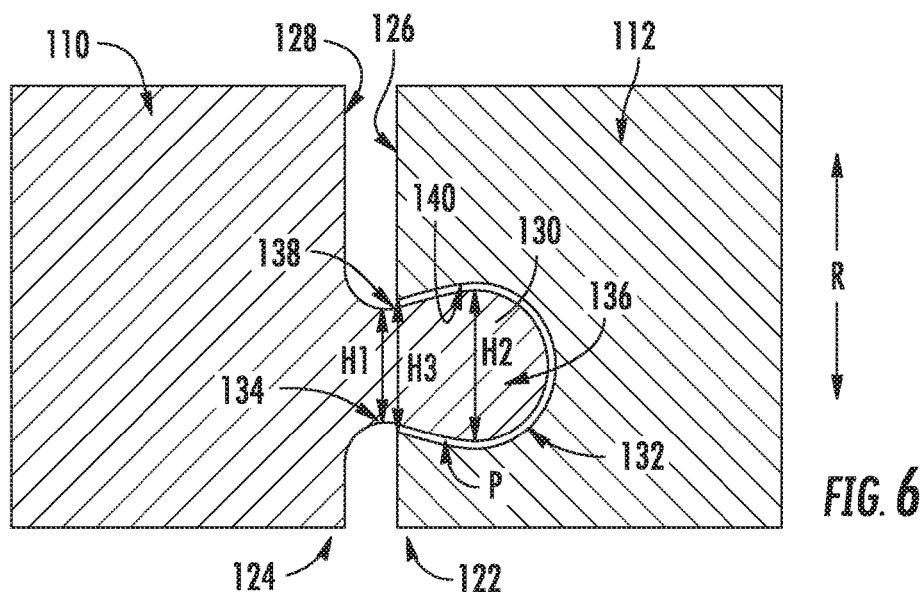
FIG. 6 provides a close up, axial cross sectional view of a first component segment nested with a second component segment of the nested segment assembly of FIG. 3.

FIG. 6 provides a close up, axial cross sectional view of the first component segment 110 nested with the second component segment 112 of FIG. 3. That is, the first component segment 110 is connected or interlocked with the second component segment 112 but is not attached to the second component segment 112. As shown in FIG. 6, the tongue 130 has a neck 134 that extends from the second end face 128 of the first component segment 110. A nesting portion 136 of the tongue 130 extends from the neck 134 and is nested within the groove 132 defined by the second component segment 112. As shown, the groove 132 is sized and shaped to receive at least a portion of the nesting portion 136 of the tongue 130. As the first component segment 110 is nested with the second component segment 112, the two (2) components need not be assembly together, e.g., with a spline seal. This may, for example, advantageously reduce assembly time.

At least some portion of the neck 134 has a height H1. At least some portion of the nesting portion 136 has a height H2. Moreover, as shown in FIG. 6, the groove 132 has an opening 138 and is defined by one or more interior surfaces 140 of the second component segment 112. The opening 138 of the groove 132 is defined at the first end face 126 of the second component segment 112, e.g., along the radial direction R. The opening 138 of the groove 132 has a height H3. To ensure that the tongue 130 nests within the groove 132 and to prevent the first component segment 110 from separating from the second component segment 112, e.g., along the circumferential direction C, the height H2 of the nesting portion 136 of the tongue 130 is greater than the height H3 of the opening 138. That is, the portion of the tongue 130 of the first component segment 110 (e.g., the nesting portion 136 of the tongue 130) that is nested within the groove 132 defined by the second component segment 112 is sized larger than the opening 138 of the groove 132. Thus, the first component segment 110 and the second component segment 112 are nested together and may be deemed an inseparable assembly. That is, the first component segment 110 and the second component segment 112 are not separable by any force or forces expected during operation of the turbomachinery in which they are installed, e.g., the turbofan 10 of FIG. 1. Moreover, as shown, the height H1 of the neck 134 is less than the height H3 of the opening 138.

As further shown in FIG. 6, a flow path P is defined between the tongue 130 and the one or more interior surfaces 140 defining the groove 132 of the second component segment 112. The flow path P allows for a small amount of air to leak outboard to inboard (e.g., if the nested segment assembly 100 is positioned within the turbine section of a turbomachine) or inboard to outboard (e.g., if the nested segment assembly 100 is positioned within the compressor section of a turbomachine). As will be explained in greater detail herein, the pressure drop across the flow path P may be customized and additively built sealing features may be positioned along the flow path P. As the pressure drop across the flow path P may be customized, the competing considerations of turbomachinery efficiency and allowing for thermal growth of such components may be balanced and optimized.

Figure 7:
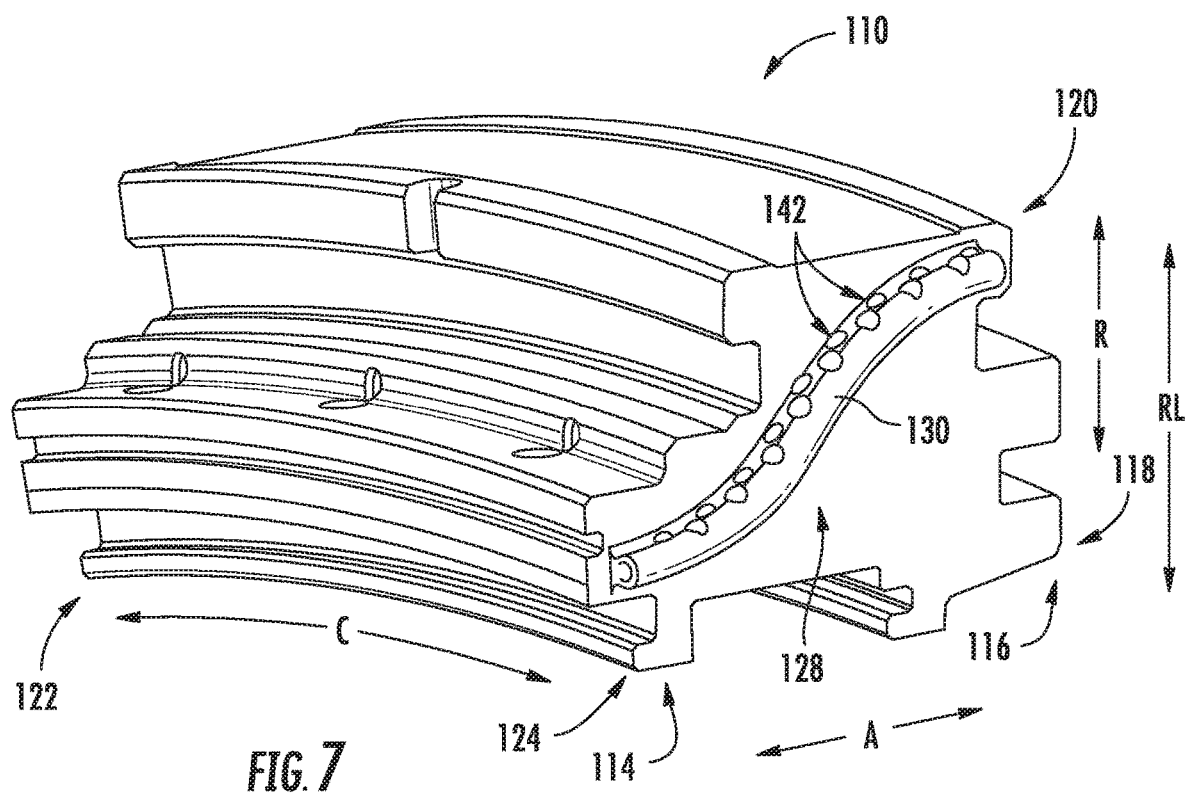
FIG. 7 provides a perspective view of an exemplary component segment in accordance with exemplary embodiments of the present disclosure.
Figure 8:
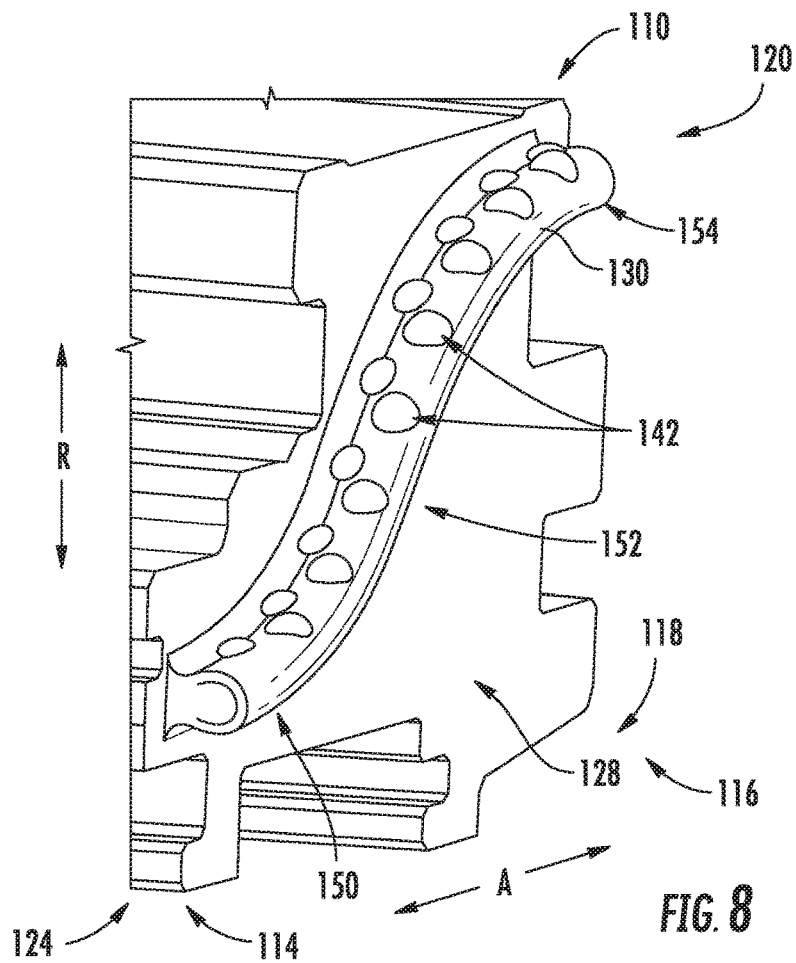
FIG. 8 provides a close up view of a second end of the component segment of FIG. 7.

FIGS. 7 and 8 provide various views of an exemplary component segment in accordance with exemplary embodiments of the present disclosure. In particular, FIG. 7 provides a perspective view of the exemplary component segment and FIG. 8 provides a close up view of the second end of the component segment of FIG. 7. More particularly still, the component segment depicted in FIGS. 7 and 8 depict features of the first component segment 110 of the nested segment assembly 100 of FIG. 3 in more detail.

As shown in FIGS. 7 and 8, the tongue 130 projects from the second end face 128 of the first component segment 110. Specifically, the tongue 130 extends substantially between the forward end 114 and the aft end 116, e.g., along the axial direction A. For this embodiment, the tongue 130 extends greater than eighty percent (80%) of the axial length of the first component segment 110. Further, the first component segment 110 has a radial length RL (FIG. 7) extending between the inner end 118 and the outer end 120 of the first component segment 110 along the radial direction R. For this embodiment, the tongue 130 extends at least half the radial length RL of the first component segment 110. Accordingly, the tongue 130 not only projects outward from the second end face 128 of the first component segment 110 along the circumferential direction C, the tongue 130 extends substantially along the axial length and the radial length RL of the first component segment 110.

Figure 9:
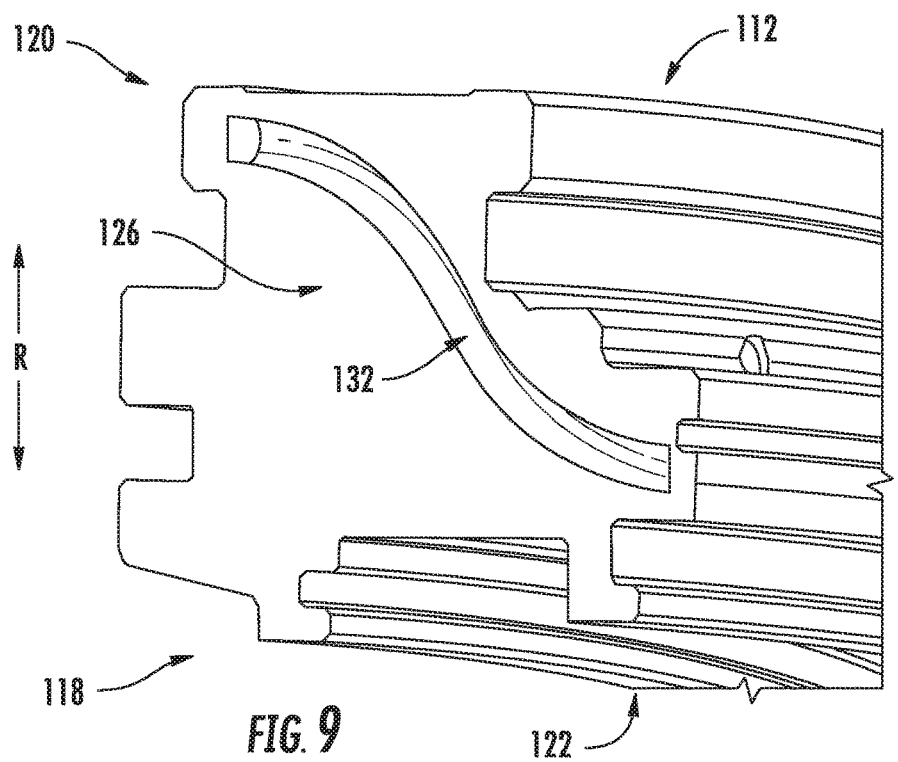
FIG. 9 provides a close up view of a first end of a component segment that may be nested with the second end of the component segment of FIGS. 7 and 8.

FIG. 9 provides a close up view of the first end of an adjacent component segment that may be nested with the component segment of FIGS. 7 and 8. More particularly, the component segment depicted in FIG. 9 depict features of the second component segment 112 of the nested segment assembly 100 of FIG. 3 in more detail. In FIG. 9, the component segments are not shown nested for illustrative purposes. As shown in FIG. 9, the groove 132 of the second component segment 112 defined at the first slash 126 extends axially and radially in a similar fashion to the tongue 130 of the first component segment 110 so as to allow for nesting of all or substantially all of the tongue 130 of the first component segment 110 in the groove 132 of the second component segment 112. As will be appreciated, the first component segment 110 of FIGS. 7 and 8 may likewise include a groove that extends axially and radially in a similar fashion to the groove 132 shown in FIG. 9 so as to allow for nesting of all or substantially all of the tongue 130 of another adjacent component segment.

With reference again to FIGS. 7 and 8, as shown, the tongue 130 includes a forward portion 150, a transition portion 152, and an aft portion 154. The forward portion 150 is positioned at or adjacent the forward end 114 of the first component segment 110 and is disposed inward of the transition portion 152 and the aft portion 154 of the tongue 130 along the radial direction R. As the forward portion 150 extends aft along the axial direction A and begins to curve upward along the radial direction R, the forward portion 150 transitions to the transition portion 152. As the transition portion 152 extends aft along the axial direction A, the transition portion 152 of the tongue 130 slopes upward along the radial direction R. Moreover, as the transition portion 152 extends aft along the axial direction A, the transition portion 152 curves into the aft portion 154 of the tongue 130. Particularly, the tongue 130 has the opposite curvature where the tongue 130 transitions from the transition portion 152 to the aft portion 154 than where the tongue 130 transitions from the forward portion 150 to the transition portion 152. The aft portion 154 of the tongue is disposed outward of both the transition portion 154 and the forward portion 150 of the tongue 130. Generally, the tongue 130 projects from the first end face 126 of the first component segment 110 in an S-shaped or sigmoid shaped curve as viewed from the circumferential direction C.

As further depicted in FIG. 8, for this embodiment, the tongue 130 includes a plurality of turbulators 142 projecting therefrom. Particularly, for this embodiment, the plurality of turbulators 142 are hemispherical projections. In alternative embodiments, the turbulators 142 may be conically shaped, rectangular cuboids, some other suitable shape, a combination thereof, etc. For this embodiment, some of the turbulators 142 project from the neck 134 and some of the turbulators 142 project from the nesting portion 136 of the tongue 130. The turbulators 142 projecting from the neck 134 are spaced from one another along the axial direction A, and similarly, the turbulators 142 projecting from the nesting portion 136 are spaced from one another along the axial direction A. The turbulators 142 projecting from the neck 134 are offset from or alternate axially with the turbulators 142 projecting from the nesting portion 136 as shown in FIG. 8.

Figure 10:
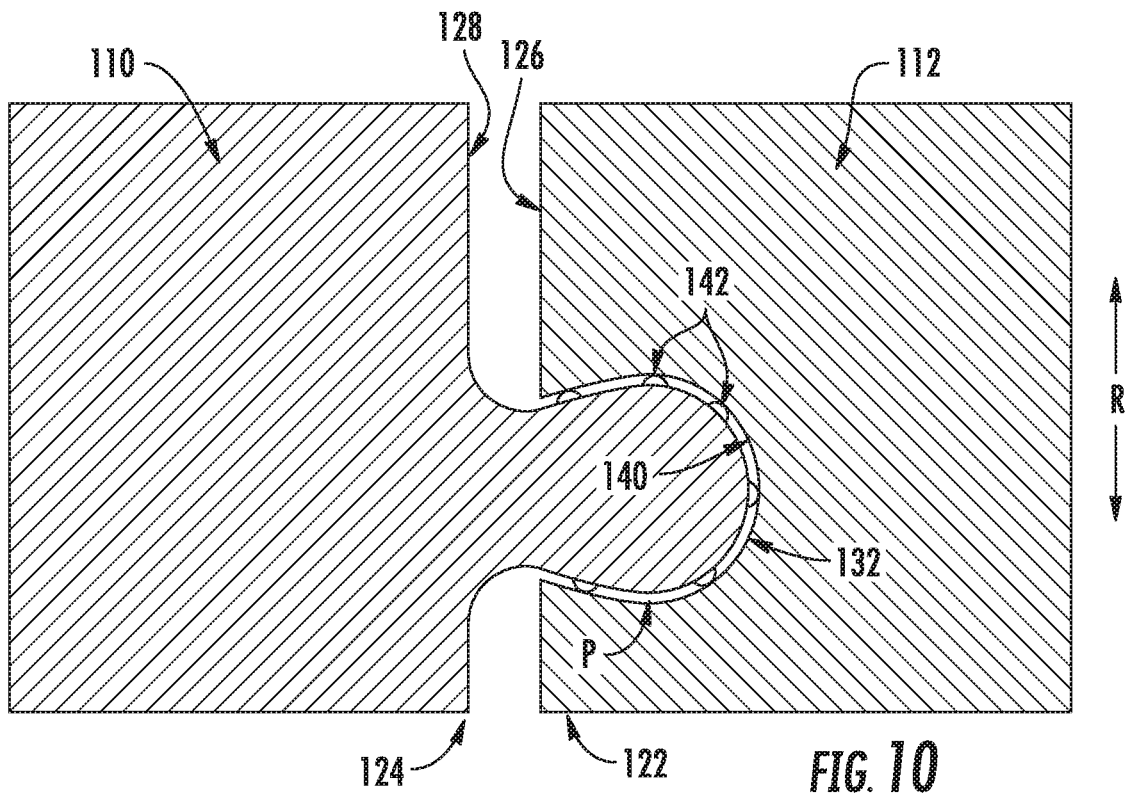
FIG. 10 provides a close up, axial cross sectional view of the component segment of FIG. 7 nested with the component segment of FIG. 9.

FIG. 10 provides a close up, axial cross sectional view of the first component segment 110 of FIGS. 7 and 8 nested with the second component segment 112 of FIG. 9. As shown in FIG. 10, the turbulators 142 projecting from tongue 130 create a tortuous flow path P. The tortuous flow path P causes fluid (e.g., compressed air) to twist and turn both circumferentially and axially as the fluid moves generally radially through the flow path P. The relatively long, horseshoe shape as viewed from the axial direction A of the flow path P causes friction losses and the turbulators 142 cause turning losses. Such losses ultimately reduce the pressure of the fluid attempting to leak through the flow path P, and accordingly, leakage across may be controlled to a satisfactory level. As noted above, the pressure drop across the flow path may be customized. This may be done by positioning the turbulators 142 in certain positions, additively printing more or less turbulators 142, changing the shape of the turbulators 142, etc.

Figure 11:
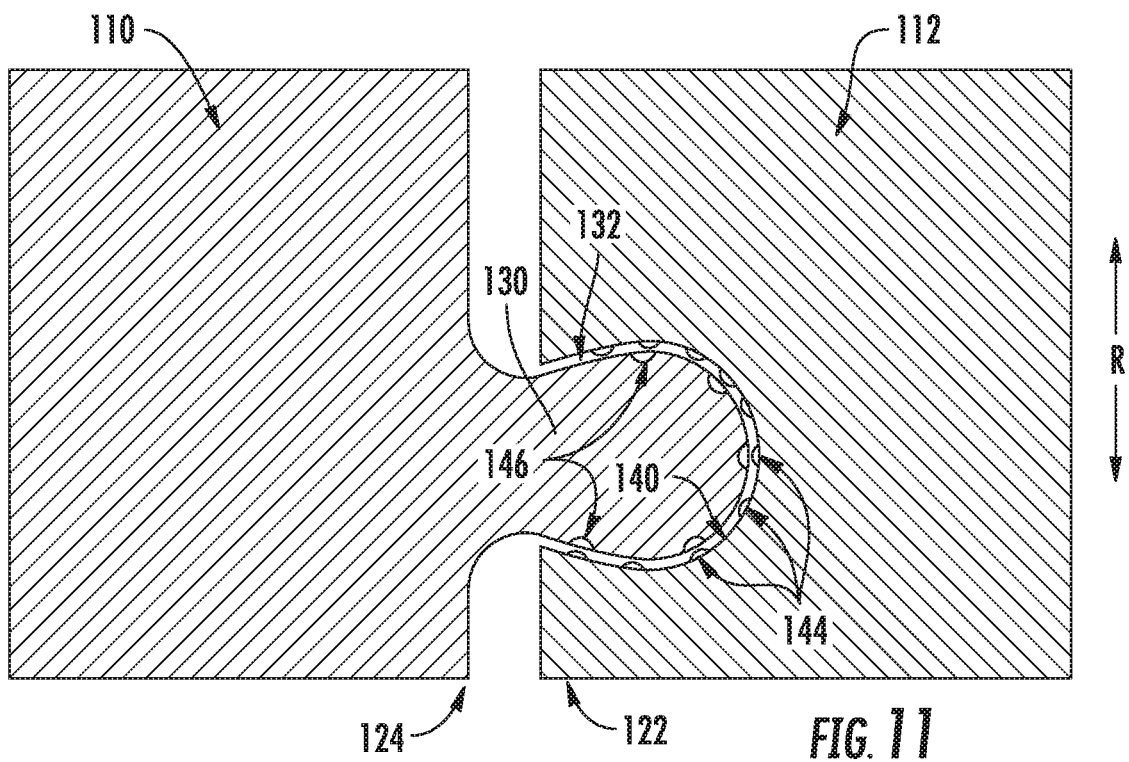
FIG. 11 provides a close up, axial cross sectional view of one exemplary first component segment nested with one exemplary second component segment in accordance with exemplary embodiments of the present disclosure.

FIG. 11 provides a close up, axial cross sectional view of one exemplary first component segment 110 nested with one exemplary second component segment 112. As shown, additionally or alternatively to the turbulators features noted above, the interior surfaces 140 defining the groove 132 may include a plurality of turbulators 144 projecting therefrom. The turbulators 144 may be shaped as noted above with respect to the turbulators 142. Moreover, a plurality of depressions 146 are defined by the tongue 130 to define the flow path P. Each depression 146 opposes a corresponding turbulator 144. The opposing turbulators 144 and depressions 146 create constricting flow passages with additional turns and surfaces that the fluid may contact, which ultimately reduces the pressure of the fluid. For this embodiment, the depressions 146 are defined as hemispherical depressions. However, other suitable shapes are possible, such as a conically shaped depressions, circular, etc. Further, in some embodiments, the depressions 146 need not oppose a corresponding turbulator 144. Advantageously, by printing the tongue 130 so as to define depressions 146 in the tongue 130, less material is required to print the tongue 130. Further, in some embodiments, the interior surfaces 140 of the second component segment 112 may likewise define a plurality of depressions.

Figure 12:
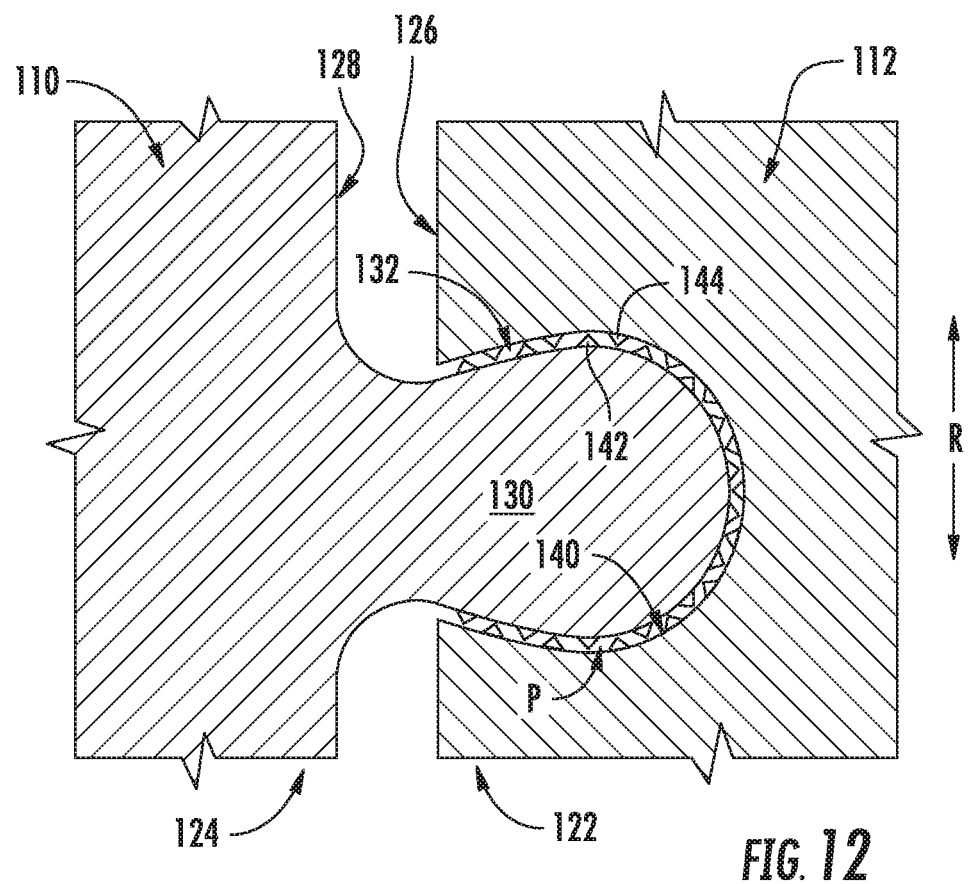
FIG. 12 provides a close up, axial cross sectional view of one exemplary first component segment nested with one exemplary second component segment in accordance with exemplary embodiments of the present disclosure.
Figure 13:
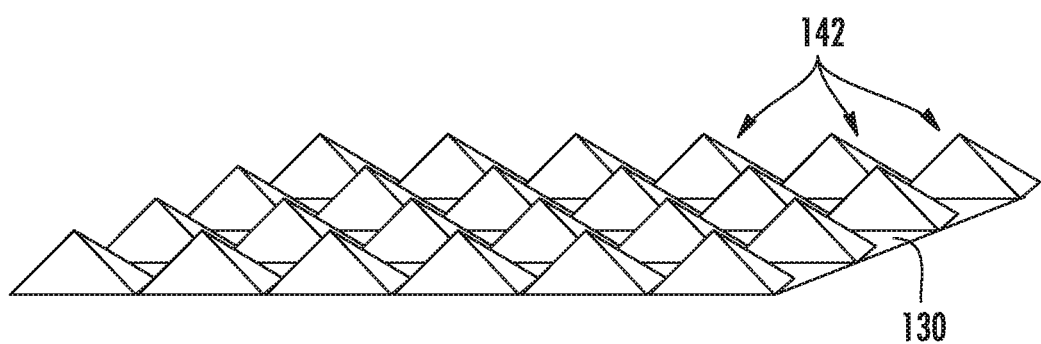
FIG. 13 provides a close up view of a plurality of turbulators of the first component segment of FIG. 12.

Referring now to FIGS. 12 and 13, FIG. 12 provides a close up, axial cross sectional view of one exemplary first component segment 110 nested with one exemplary second component segment 112. As shown, additionally or alternatively to the turbulators features noted above, the interior surfaces 140 defining the groove 132 may include a plurality of turbulators 144 projecting therefrom and the tongue 130 may include a plurality turbulators 142 projecting therefrom that have a pyramid shape. FIG. 13 provides a close up view of the plurality of turbulators 142 projecting from the tongue 130 of the first component segment of FIG. 12. It will be appreciated that the turbulators 144 projecting from the interior surfaces 140 defining the groove 132 may be similarly shaped to the turbulators 142 depicted in FIG. 13.

Notably, in accordance with the exemplary embodiments described herein, the first component segment 110 is simultaneously additively manufactured with the second component segment 112. Other component segments may also be simultaneously additively manufactured. For example, with reference to FIG. 3, the first component segment 110 and the second component segment 112 may be additively manufactured on a build platform or bed 162 of an additive manufacturing machine 160, e.g., along the axial direction A. For instance, an energy source 164 of the additive manufacturing machine 160 may selectively direct energy to successively fuse one or more layers of additive material to form the nested segment assembly 100. In this regard, the first component segment 110 and the second component segment 112 are thus additively manufactured (e.g., "printed") simultaneously layer-by-layer along the axial direction A from their aft ends 116 to their forward ends 114 (FIG. 7), or vice versa, using one or more of the additive manufacturing techniques described above. In some embodiments, the first component segment 110 and the second component segment 112 may be additively manufactured on a build platform or bed, e.g., along the radial direction R.

Figure 14:
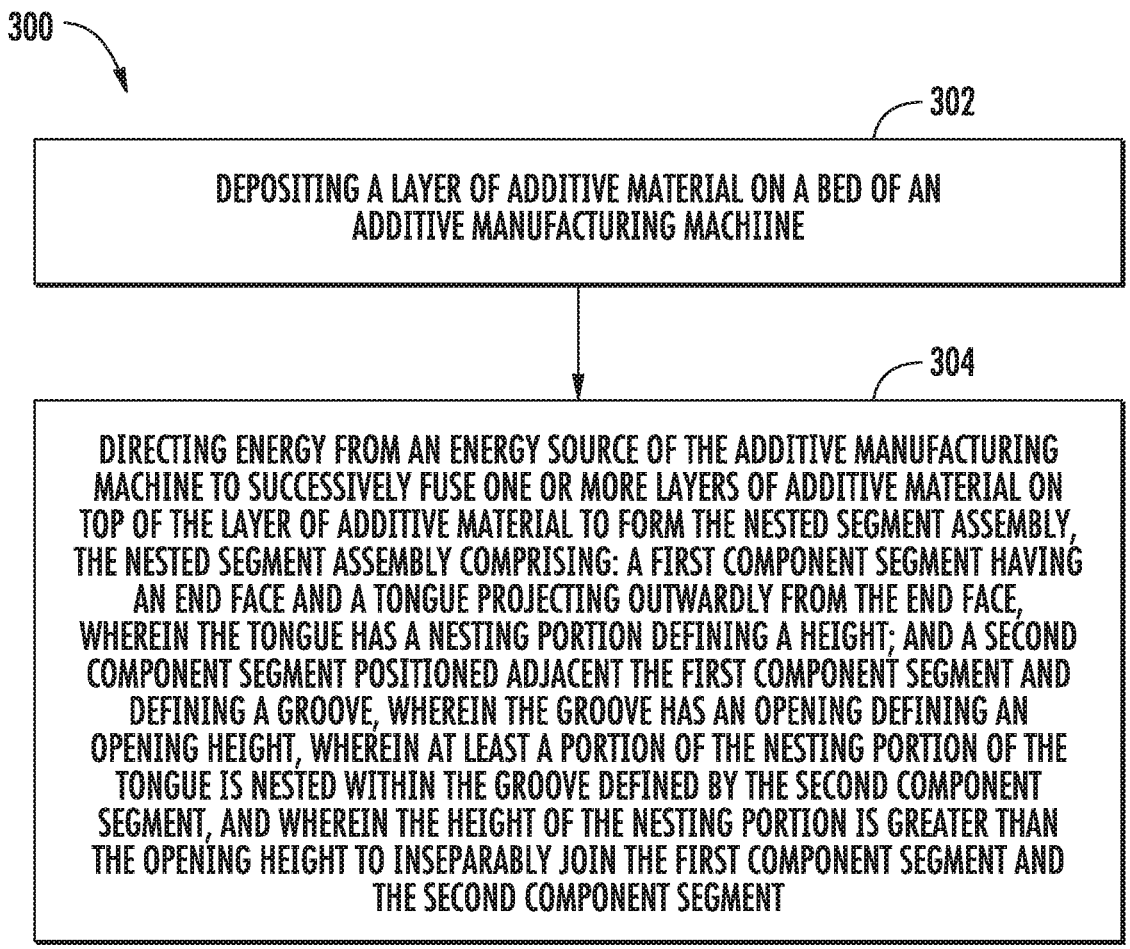
FIG. 14 provides a flow diagram of an exemplary method for manufacturing a nested segment assembly in accordance with exemplary embodiments of the present disclosure.

FIG. 14 provides a flow diagram of an exemplary method (300) for manufacturing a nested segment assembly in accordance with exemplary embodiments of the present disclosure. For instance, the exemplary method (300) may be utilized to additively manufacture the nested segment assembly 100 of the present disclosure using one or more of the additive manufacturing techniques described above. It should be appreciated that the exemplary method (300) is discussed herein only to describe exemplary aspects of the present subject matter, and is not intended to be limiting.

At (302), the method (300) includes depositing a layer of additive material on a bed of an additive manufacturing machine. For instance, an additive manufacturing machine may deposit a layer of additive material on a bed or platform. The layer of additive material may be formed of any suitable material, such as e.g., metal, some other material noted herein, or a combination thereof.

At (304), the method (300) includes selectively directing energy from an energy source of the additive manufacturing machine to successively fuse one or more layers of additive material on top of the layer of additive material to form the nested segment assembly. For instance, the nested segment assembly 100 formed may be similar in some or all respects to the nested segment assembly 100 described above.

For instance, the nested segment assembly formed at (304) may include a first component segment having an end face and a tongue projecting outwardly from the end face. The tongue has a nesting portion defining a height. The nested segment assembly also includes a second component segment positioned adjacent the first component segment. The second segment component defines a groove. The groove has an opening defining an opening height. At least a portion of the nesting portion of the tongue is nested within the groove defined by the second component segment. Further, the height of the nesting portion is greater than the opening height to inseparably join the first component segment and the second component segment. Notably, in some exemplary implementations, the first component segment and the second component segment are simultaneously additively manufactured as distinct, but inseparable monolithic components.

In some implementations, during directing energy from the energy source of the additive manufacturing machine to successively fuse the one or more layers of additive material on top of the layer of additive material to form the nested segment assembly at (304), a flow path is defined between the tongue and one or more interior surfaces defining the groove of the second component segment. For instance, as shown in any one of FIGS. 3, 6, 8, and 9, the flow path P is defined between the tongue 130 and one or more interior surfaces 140 defining the groove 132 of the second component segment 112. Further, in some implementations, the flow path is defined having a horseshoe shape as viewed along the axial direction. For instance, as shown in any one of FIGS. 3, 6, 8, and 9, the flow path P is defined having a hippocrepiform or horseshoe shape. The horseshoe shape increases the friction and turning losses of the fluid flowing therethrough.

In some further implementations, during directing energy from the energy source of the additive manufacturing machine to successively fuse the one or more layers of additive material on top of the layer of additive material to form the nested segment assembly at (304), a plurality of turbulators project from at least one of the tongue of the first component segment and the one or more interior surfaces of the second component segment to define the flow path. For instance, in the depicted embodiment of FIG. 10, a plurality of turbulators 142 project from the tongue 130 of the first component segment 110. In the depicted embodiment of FIG. 11, a plurality of turbulators 144 project from the one or more interior surfaces 140 of the second component segment 112. In some implementations, although not shown, a plurality of turbulators 142 project from the tongue 130 of the first component segment 110 and a plurality of turbulators 144 project from the one or more interior surfaces 140 of the second component segment 112.

In some implementations, during directing energy from the energy source of the additive manufacturing machine to successively fuse the one or more layers of additive material on top of the layer of additive material to form the nested segment assembly at (304), a plurality of depressions are defined by at least one of the tongue of the first component segment and the one or more interior surfaces of the second component segment to define the flow path. For instance, as shown in FIG. 11, a plurality of depressions 146 are defined by the tongue 130 of the first component segment 110. The depressions 146 define the flow path P. In some implementations, although not shown, additionally or alternatively, a plurality of depressions 146 are defined by the interior surfaces 140 of the second component segment 112. Such depressions 146 may define the flow path P.

An additively manufactured nested segment assembly and a method for manufacturing the nested segment assembly are described above. Notably, the nested segment assembly may generally include performance-enhancing features whose practical implementations are facilitated by an additive manufacturing process. For example, using the additive manufacturing methods described herein, the nested segment assembly may include a first component segment that is nested with and inseparably formed with a second component segment but which still accommodate the thermal growth of the component segments and allow for relative movement between the component segments, e.g., for ease of assembly. These features may be introduced during the design of the nested segment assembly such that they may be easily integrated into the nested segment assembly during the build process at little or no additional cost.

In some instances, a nested segment assembly may be printed as a full annular ring and assembled into a turbine engine. In other instances, due to the size of the ring or other practical considerations, two or more nested segment assemblies may be printed in a nested fashion as described above and the assemblies may be connected together via traditional methods, such as e.g., by spline seals. Although such traditional methods may present certain challenges as noted previously, such annular rings may be more efficiently assembled by nesting at least some of the component segments into nested segment assemblies and then connecting them.

Figure 15:
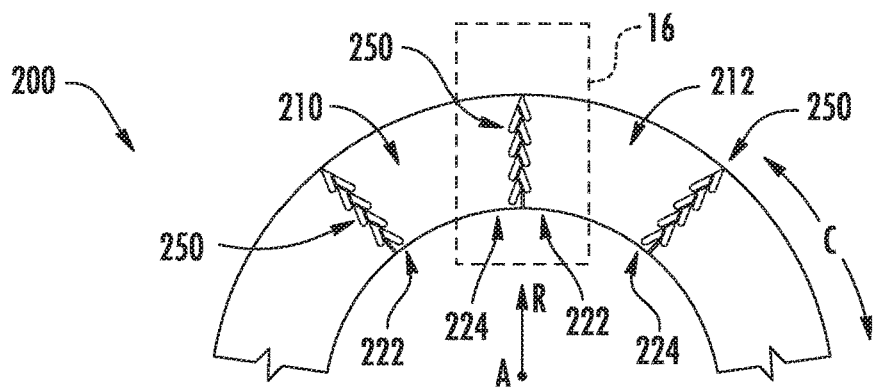
FIG. 15 provides an axial view of part of an exemplary segmented component assembly in accordance with exemplary embodiments of the present disclosure.
Figure 16:
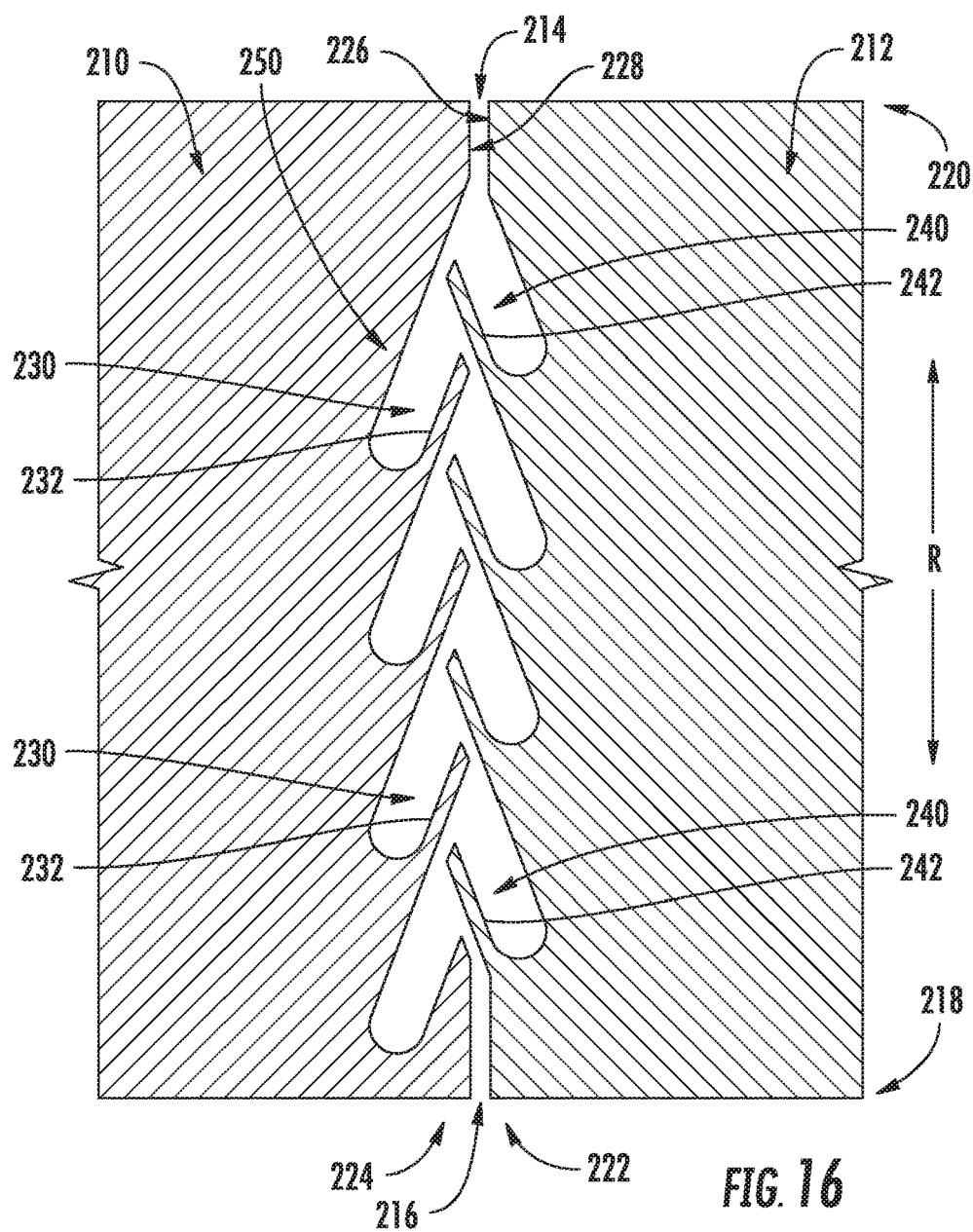
FIG. 16 provides a close up, axial cross sectional view of Section 16 of FIG. 15 depicting one exemplary first component segment positioned adjacent one exemplary second component segment of the segmented component assembly of FIG. 15 in accordance with exemplary embodiments of the present disclosure.
Figure 17:
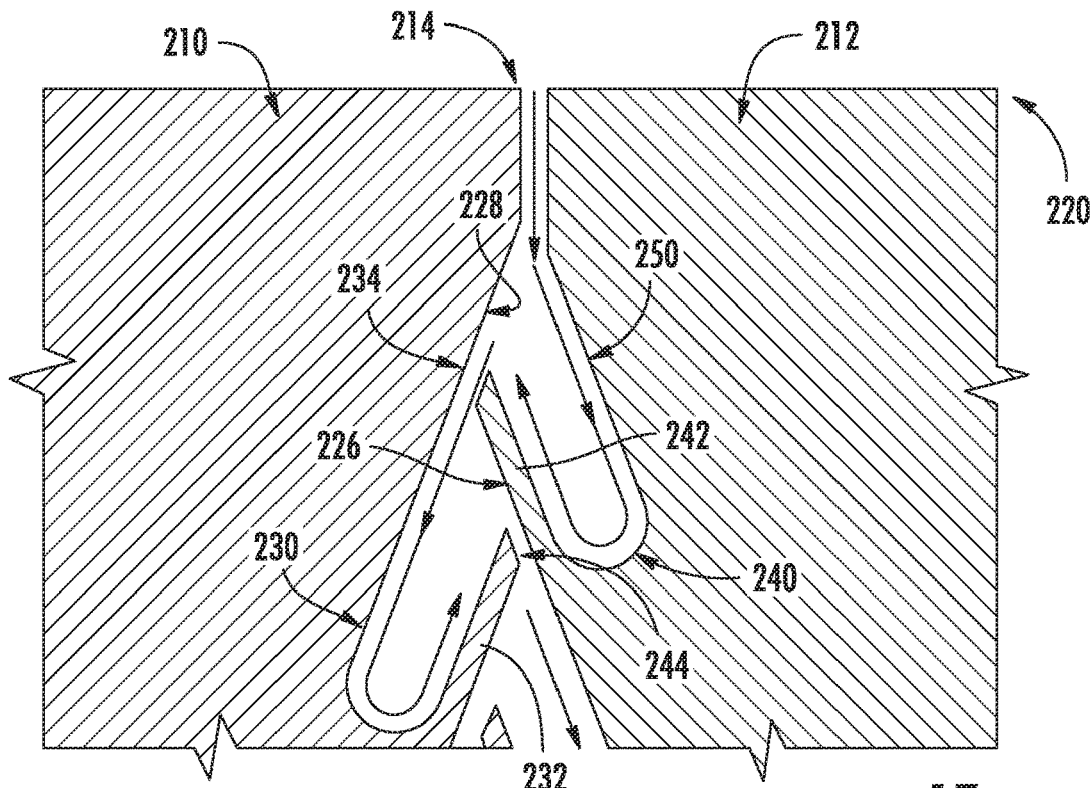
FIG. 17 provides a close up, axial cross sectional view of one exemplary first component segment positioned adjacent one exemplary second component segment of the segmented component assembly of FIG. 15 in accordance with exemplary embodiments of the present disclosure.

FIGS. 15, 16, and 17 provide various views of an exemplary segmented component assembly in accordance with exemplary embodiments of the present disclosure. In particular, FIG. 15 provides an axial view of an exemplary segmented component assembly 200. FIG. 16 provides a close up, axial cross sectional view of Section 16 of FIG. 15 depicting a first component segment 210 positioned adjacent one exemplary second component segment 212 of the segmented component assembly 200. Moreover, FIG. 17 provides a close up, axial cross sectional view of the first component segment 210 positioned adjacent the second component segment 212 of the segmented component assembly 200 of FIG. 15.

As shown, the component segments 210, 212 may be configured in a similar manner as the component segments 110, 112 noted above, except as provided below. Particularly, each component segment 210, 212 extends between a forward end and an aft end, e.g., along the axial direction A, between an inner end 218 and an outer end 220, e.g., along the radial direction R, and between a first end 122 and a second end 124, e.g., along the circumferential direction C. Further, each of the component segments 210, 212 have a first end face 226 at their respective first ends 222 a second end face 228 at their respective second ends 224. Generally, the first and second end faces 226, 228 of the component segments are orthogonal to the circumferential direction C.

As shown best in FIG. 16, for this embodiment, a tesla valve 250 is defined between the first component segment 210 and the second component segment 212. Generally, the tesla valve 250 causes leakage flow moving from outboard to inboard (i.e., from outer end 220 to inner end 218) to flow against itself without utilizing any variable geometry or moving parts. The tesla valve 250 is formed by features along the second end face 228 of the first component segment 210 and the first end face 226 of the adjacent second component segment 212. More particularly, the first component segment 210 defines a plurality buckets or recesses 230 spaced from one another by partition walls 232 at its second end face 228. The recesses 230, each separated by a partition wall 232, extend substantially along the radial length of the first component segment 210 along the radial direction R. Moreover, the recesses 230 extend substantially along the axial length of the first component segment 210 along the axial direction A. In this way, leakage may be controlled both axially and radially. Similarly, the second component segment 212 defines a plurality buckets or recesses 240 spaced from one another by partition walls 242 at its first end face 226. The recesses 240, each separated by a partition wall 242, extend substantially along the radial length of the second component segment 212 along the radial direction R. The recesses 240 defined by the second component segment 212 are defined in an alternating arrangement with the recesses 230 defined by the first component segment 214. Thus, as fluid flows through the tesla valve 250, fluid flows downstream from recess 240 to recess 230 in an alternating manner as will be explained more fully below. Moreover, the recesses 240 extend substantially along the axial length of the second component segment 212 along the axial direction A. In this way, leakage may be controlled both axially and radially. It will be appreciated that the first component segment 210 may have a first end face 226 that includes the same features as its second end face 228 and that second component segment 212 may have a second end face 228 that includes the same features as its first end face 226. Further, it will be appreciated that an annular ring of segmented components may have similar features as described above.

As shown best in FIG. 17, in operation, fluid flowing from outboard to inboard is directed through an outboard opening 214 into the recess 240 defined by the second component segment 212. The fluid flows inboard into the recess 240 and is then deflected nearly one hundred eighty degrees (180°) in an outboard direction. The outboard flow of the fluid greatly impedes additional fluid from flowing into the outboard opening 214. Notably, however, some fluid passes through a channel 234 defined between the partition wall 242 and the second end face 228 of the first component segment 210. The fluid is accelerated through the channel 234 in an inboard direction and flows into the recess 230 defined by the first component segment 210. The fluid flows inboard into the recess 230 and is then deflected nearly one hundred eighty degrees (180°) in an outboard direction. The outboard flow of the fluid greatly impedes fluid from flowing through the channel 234. However, some fluid passes through a channel 244 defined between the partition wall 242 and the first end face 226 of the second component segment 212. The fluid continues flowing downstream in this manner until the fluid exits through an inboard opening 216 (FIG. 16). Notably, the geometry of the recesses 230, 240 cause violent surges and eddies in the fluid that materially interfere with the fluid flow between the component segments 210, 212 from outboard to inboard.

Figure 18:
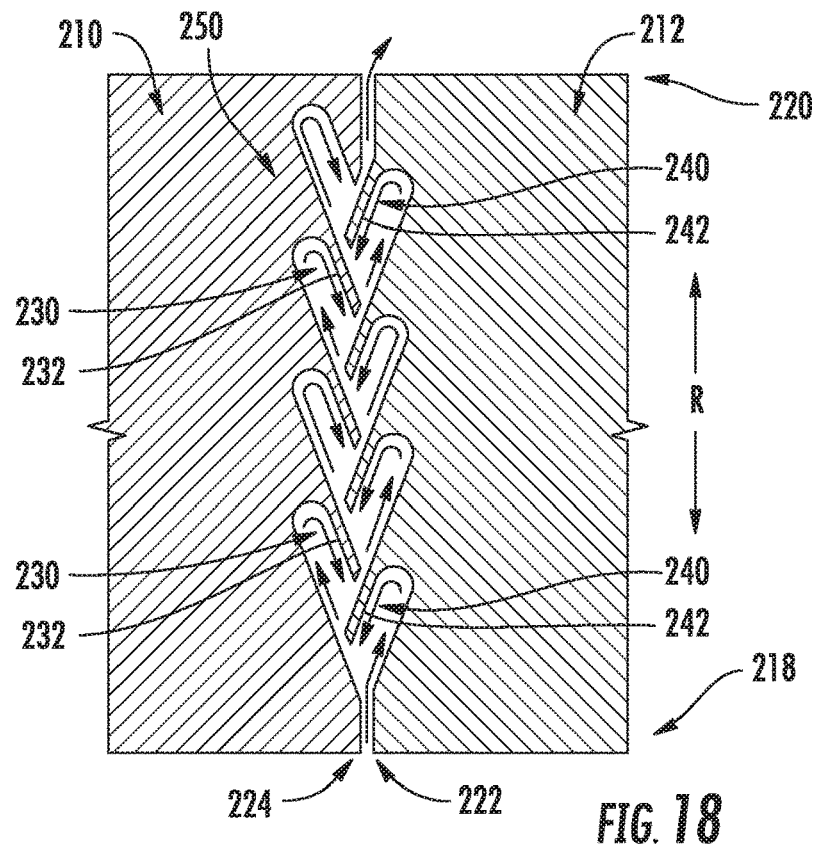
FIG. 18 provides a close up, axial cross sectional view of a first exemplary component segment positioned adjacent an exemplary second component segment of an exemplary segmented component assembly in accordance with exemplary embodiments of the present disclosure.

Further, although four (4) recesses 230 and four recesses 240 are shown for the tesla valve 250, any suitable number of recesses are possible as may be determined by leakage flow rate between the segmented components. The geometry of the tesla valve 250 may be created by machining or by a suitable additive manufacturing process as described herein. In addition, the features of the tesla valve 250 may be machined or additively printed to impede flow in other directions, such as e.g., from inboard to outboard as shown in FIG. 18. Further, the tesla valve 250 described herein may be used in conjunction with or alternatively to other sealing methods, such as e.g., spline seals or the nesting features described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additively manufactured nested segment shroud assembly for a gas turbine engine, comprising:
   a first component segment having an end face and a tongue projecting outwardly from the end face; and
   a second component segment positioned adjacent the first component segment and defining a groove,
   wherein at least a portion of the tongue of the first component segment is nested within the groove defined by the second component segment, and
   wherein the tongue comprises a plurality of turbulators projecting therefrom.

2. The nested segment shroud assembly of claim 1, wherein the plurality of turbulators are hemispherical projections.

3. The nested segment shroud assembly of claim 1, wherein the plurality of turbulators projecting from the tongue have a pyramid shape.

4. The nested segment shroud assembly of claim 1, wherein the nested segment shroud assembly defines an axial direction and the first component segment extends between a forward end and an aft end along the axial direction, and wherein the tongue extends substantially between the forward end and the aft end along the axial direction.

5. The nested segment shroud assembly of claim 1, wherein the nested segment shroud assembly defines a radial direction and wherein the first component segment has a radial length extending between an inner end and an outer end, and wherein the tongue extends at least half the radial length of the first component segment along the radial direction.

6. The nested segment shroud assembly of claim 1, wherein a flow path is defined between the tongue and one or more interior surfaces defining the groove of the second component segment.

7. The nested segment shroud assembly of claim 1, wherein the portion of the tongue of the first component segment nested within the groove defined by the second component segment is sized larger than an opening of the groove.

8. The nested segment shroud assembly of claim 1, wherein the first component segment and the second component segment are one of adjacent shroud hangers, adjacent shrouds, and adjacent nozzle segments of a turbine engine.

9. The nested segment shroud assembly of claim 1, wherein the nested segment shroud assembly is one of a plurality of nested segment assemblies assembled together to form an annular ring.

10. The nested segment shroud assembly of claim 1, wherein the nested segment shroud assembly defines an axial direction and wherein a flow path is defined between the tongue and one or more interior surfaces defining the groove of the second component segment, and wherein the flow path has a horseshoe shape as viewed from the axial direction.

11. The nested segment shroud assembly of claim 1, wherein a plurality of depressions are defined by at least one of the tongue and one or more interior surfaces defining the groove.

12. The nested segment shroud assembly of claim 11, wherein at least one of the plurality of turbulators opposes one of the plurality of depressions.

13. The nested segment shroud assembly of claim 1, wherein the first component segment and the second component segment of the nested segment shroud assembly are simultaneously additively manufactured as distinct, but inseparable monolithic components.

14. The nested segment shroud assembly of claim 1, wherein the nested segment shroud assembly defines a radial direction and an axial direction, and wherein the first component segment extends between a forward end and an aft end along the axial direction and an inner end and an outer end along the radial direction, and wherein the tongue extends between a forward portion and an end portion along the axial direction, the end portion being disposed outward of the forward portion along the radial direction.

15. A method for manufacturing a nested segment shroud assembly for a gas turbine engine, the method comprising:
depositing a layer of additive material on a bed of an additive manufacturing machine; and
directing energy from an energy source of the additive manufacturing machine to successively fuse one or more layers of additive material on top of the layer of additive material to form the nested segment shroud assembly, the nested segment shroud assembly comprising:
a first component segment having an end face and a tongue projecting outwardly from the end face, wherein the tongue has a nesting portion defining a height; and
a second component segment positioned adjacent the first component segment and defining a groove, wherein the groove has an opening defining an opening height, wherein at least a portion of the nesting portion of the tongue is nested within the groove defined by the second component segment, and wherein the height of the nesting portion is greater than the opening height to inseparably join the first component segment and the second component segment, and
wherein directing energy from the energy source of the additive manufacturing machine to successively fuse the one or more layers of additive material on top of the layer of additive material to form the nested segment shroud assembly comprises forming a flow path between the tongue and one or more interior surfaces defining the groove of the second component segment, and wherein a plurality of turbulators project from at least one of the tongue of the first component segment and the one or more interior surfaces of the second component segment to define the flow path.

16. The method of claim 15, wherein during directing energy from the energy source of the additive manufacturing machine to successively fuse the one or more layers of additive material on top of the layer of additive material to form the nested segment shroud assembly, a plurality of depressions are defined by at least one of the tongue of the first component segment and the interior surfaces of the second component segment to define the flow path.

17. A segmented component shroud assembly for a gas turbine engine, the segmented component shroud assembly defining an axial direction, a radial direction, and a circumferential direction, the segmented component shroud assembly comprising:
a first component segment having an end face;
a second component segment positioned adjacent the first component segment along the circumferential direction of the segmented component shroud assembly and having an end face; and
a tesla valve formed between the first component segment and the second component segment along the circumferential direction of the segmented component shroud assembly by the end face of the first component segment and the end face of the second component segment.

18. The segmented component shroud assembly of claim 17, wherein the first component segment defines a plurality of recesses at the end face of the first component segment and the second component segment defines a plurality of recesses at the end face of the second component segment, and wherein the plurality of recesses at the end face of the first component segment and the plurality of recesses at the end face of the second component segment are arranged in an alternating arrangement to form the tesla valve.

19. The segmented component shroud assembly of claim 18, wherein the tesla valve extends lengthwise along the radial direction.

20. The segmented component shroud assembly of claim 19, wherein the end face of the first component segment faces and is positioned adjacent to the end face of the second component along the circumferential direction.

* * * * *